United States Patent [19]

Kanai et al.

[11] 4,439,479
[45] Mar. 27, 1984

[54] SLIPPERY BIAXIALLY STRETCHED POLYESTER FILMS

[75] Inventors: Tamaki Kanai, Sagamihara; Hirofumi Yoshikawa, Hachioji; Takashi Yamagishi, Yokohama; Kenji Suzuki; Yoshikatsu Ohta, both of Sagamihara, all of Japan

[73] Assignee: Teijin Limited, Osaka, Japan

[21] Appl. No.: 338,652

[22] Filed: Jan. 11, 1982

[51] Int. Cl.³ .............................................. B32B 3/00
[52] U.S. Cl. .................................. 428/148; 428/172; 428/328; 428/480; 428/692; 428/694; 428/910
[58] Field of Search ............. 428/692, 328, 148, 910, 428/480

[56] References Cited

U.S. PATENT DOCUMENTS 4,348,446 9/1982 Mitsuishi et al. ................. 428/148

FOREIGN PATENT DOCUMENTS 52-32970 8/1977 Japan .
56-10455 2/1981 Japan .

Primary Examiner—George F. Lesmes
Assistant Examiner—P. R. Schwartz
Attorney, Agent, or Firm—Wenderoth, Lind & Ponack

[57] ABSTRACT

A process for producing a slippery biaxially stretched polyester film, which comprises coating one or both surfaces, preferably one surface, of a running polyester film, before the completion of its crystalline orientation, with an aqueous solution or dispersion containing (A) a metal salt having the composition of the following formula

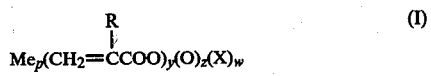

wherein Me represents a metal ion having a valence of 2 to 6, R is H or $CH_3$, X is one equivalent of an anion, y is 1-6, z is 0-2, w is 0-8, and p is a number equal to the quotient obtained by dividing the total of $y+2z+w$ by the atomic valence of Me, provided that when y is 2 or more, two or more R groups may be identical or different, when w is 2 or more, two or more X ions may be identical or different, and the group

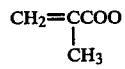

in the case of $R=CH_3$ is contained in a number of not more than 2 for each Me, and (B) a film-forming polymeric compound, a monomer thereof, or a mixture of these; and thereafter heating the coating, before completion of the crystalline orientation of the film, to convert it on the film surface into numerous minute protrusions substantially having form retention; and a slippery biaxially stretched polyester film having a substantially continuous coating with numerous protrusions substantially having form retention, said coating being formed substantially all over on at least one surface of the film and at least comprising a metal salt having the composition of formula (I) above and a film-forming polymeric compound.

6 Claims, 3 Drawing Figures

SLIPPERY BIAXIALLY STRETCHED POLYESTER FILMS

This invention relates to a slippery biaxially stretched polyester film the surface of which has a continuous coating with numerous minute protrusions.

Polyester films, especially biaxially stretched films of polyethylene terephthalate, have shown a striking demand as materials for magnetic tapes, photographic films, packaging films, metallized films for condensers, electric insulating films and graphic films because they have excellent mechanical properties, electrical properties, heat resistance and chemical resistance. In order to produce polyester films smoothly and apply them to the aforesaid usages, it is absolutely necessary to improve their slipperiness.

If a thin polyester film lacks slipperiness, it causes serious troubles to such operations as winding, rewinding, coating and slitting, resulting in undesirable phenomena such as the occurrence of winding wrinkles and the adsorption of dirt by static charges generated. For example, when various shaped articles produced by subjecting a non-stretched or monoaxially stretched film of polyethylene terephthalate to press-forming or vacuum-forming are stacked, each of the articles cannot be smoothly pulled out from the stack if the surface slipperiness of the molded articles is lacking. Hence, the operability of processing works in an assembly line decreases markedly.

Prior attempts to improve the slipperiness of polyester films include, for example, a method which comprises adding minute particles of various fillers such as silicon oxide, kaolin, talc, calcium carbonate or alumina, forming the resulting mixture into a film, and then biaxially stretching the film whereby the filler projects as minute protrusions during the reduction of the film thickness in the biaxial stretching steps. A method comprising converting the catalyst used in the production of the polyester into particles insoluble in the polymer is also known as a technique of improving the slipperiness by utilizing minute protrusions.

These techniques have been successful to some extent in that they bring about an improvement in the slipperiness of the films. Since, however, the films contain minute particles, their transparency naturally decreases or voids may occur. These problems are further desired to be solved. The reduced transparency and the formation of voids are serious drawbacks in polyester films useful as materials for diazo films, metallized films, photographic films, magnetic tapes, etc. For example, video magnetic tapes which now have an especially great demand are required to have excellent electromagnetic characteristics in order to prevent undesirable phenomena such as dropout (the loss of records) and color noises. Accordingly, the use of the aforesaid films having minute protrusions based on the filler on both surfaces thereof nearly equally may increase the slipperiness of the resulting video magnetic tapes, but undesirably results in the formation of voids which lead to dropout and color noises in the tapes. In such a magnetic tape, a magnetic coating layer is formed from a magnetic coating composition on its one surface, and therefore, the minute protrusions on this surface rarely affect the outside surface of the magnetic coating layer and the surface of the magnetic coating layer is relatively flat. In contrast, the minute protrusions on the other surface of the tape are not coated with the magnetic coating composition, and when the magnetic tape is wound up, the minute protrusions on the other surface are pushed against the magnetic coating layer having a relatively flat surface. It is impossible therefore to prevent completely the printing of the minute protrusions on the flat magnetic coating layer. In addition, films formed by the above-mentioned techniques frequently contain relatively coarse protrusions based on relatively coarse particles, and these coarse protrusions further increase the aforesaid printing. When a magnetic tape having elevations and depressions on its magnetic coating layer comes into contact with a video head, space losses occur and cause dropout and color noises.

Attempts have been made to reduce the particle size of the minute particles in order to remedy these defects of the minute protrusions, but after all, a compromise is necessary between the printing of the minute protrusions and the slipperiness of the film.

There was suggested a method for imparting slipperiness to a film which comprises forming a film from a polyester not containing minute particles instead of forming a film from a polyester containing minute particles as stated hereinabove; and coating a specified coating solution on both surfaces of the resulting film thereby to form an earthworm-like film structure on both surfaces of the polyester film (Japanese Laid-Open Patent Publication No. 10455/1981). The coating solution used in this method is a solution containing a water-soluble polymeric compound and at least one of silicones and styrene/butadiene rubber. This method differs from the aforesaid method of imparting slipperiness to a film by adding minute particles to a polyester in that slipperiness is imparted to a film by after-treatment. The difficulty with this method is that sufficient slipperiness cannot be obtained unless an earthworm-like film structure is formed on both surfaces of the film by coating them with a specified coating solution. As shown in Comparative Examples given in Table 1 of the above Japanese patent document, when the earthworm-like film structure is formed only on one surface of the polyester film, the coefficient of friction between that surface and the other surface not having an earthworm-like structure is still high and sufficient slipperiness cannot be obtained.

It is an object of this invention therefore to provide a novel slippery biaxially stretched polyester film having a continuous coating of a specified composition having numerous minute protrusions on at least one of the film surfaces.

Another object of this invention is to provide a slippery biaxially stretched polyester film of a dual structure in which only one surface thereof has a continuous coating with numerous minute protrusions and the other surface has no such coating and is substantially flat.

Still another object of this invention is to provide a slippery biaxially stretched polyester film which does not substantially cause printing of minute protrusions to such an extent as to be detrimental to various uses, for example a magnetic tape.

A further object of this invention is to provide a process for advantageously producing the slippery biaxially stretched polyester film of the invention on an industrial scale by incorporating a procedure which comprises forming a continuous coating having numerous minute protrusions on the film surface without disturbing a continuous flow of the film, into a series of continuous steps comprising extruding a molten polyester through a slit to form an unstretched thin film, monoaxially stretching it and then biaxially stretching it.

Other objects and advantages of this invention will become apparent from the following description.

In accordance with this invention, these objects and advantages are achieved by a slippery biaxially stretched polyester film having a continuous coating with numerous minute protrusions substantially having form retention on at least one surface of the film, said coating at least containing a film-forming polymeric compound and a metal salt of the following formula (I)

wherein Me represents a metal ion having a valence of 2 to 6, R is a hydrogen atom or a methyl group, X is one equivalent of an anion, y is a number of from 1 to 6, z is a number of from 0 to 2, w is a number of from 0 to 8, and p is a number equal to the quotient obtained by dividing the total of $y+2z+w$ by the atomic valence of Me, provided that when y is a number of 2 or more, two or more R groups may be identical or different, when w is a number of 2 or more, two or more X ions may be identical or different, and the group in the case of R=methyl is contained in a number of not more than 2 for each Me.

A tape base testing machine for the measurement of the kinetic friction coefficient of a rough film surface is schematically shown in FIG. 3.

According to this invention, the slippery biaxially stretched polyester film can be produced by a process which comprises coating one or both surfaces of a running polyester film, before completion of its crystalline orientation, with an aqueous solution or dispersion containing (A) a metal salt of formula (I) and (B) a film-forming polymeric compound, a monomer therof, or a mixture of these, and then converting said coating by heating into numerous minute protrusions substantially having form retention on said film before the crystalline orientation of the film is completed.

In general formula (I), Me represents a metallic ion having a valence of 2 to 6. Preferably, the metallic ion is an ion of a metal of the third to fourth periods of Groups II to VIII of the periodic table. Above all, Mg, Ca, Zn, Al, Ti and Mn ions are preferred.

In general formula (I), R is a hydrogen atom or a methyl group, preferably the former.

In general formula (I), X is one equivalent of an anion. One equivalent of an anion may be a monovalent hydroxide ion or a halogenide ion such as chloride ion (Cl−), and also include ½ of a divalent anion such as a sulfate ion (SO₄²⁻) or ⅓ of a trivalent anion such as a phosphate ion (PO₄³⁻). The hydroxide ion or the chloride ion are preferred as one quivalent of the anion.

In general formula (I), y is a number of from 1 to 6, preferably from 1 to 4; z is a number of from 0 to 2, preferably 0; w is a number of from 0 to 7, preferably from 0 to 5; and p is a number equal to the quotient obtained by dividing the total of $y+2z+w$ by the atomic valence of Me.

When y is a number of two or more, two or more R groups may be identical (namely, all R groups are hydrogen or methyl group) or different (namely, R groups consist of H and CH₃). When w is a number of 2 or more, two or more X's may be identical (e.g., all X's are Cl atoms) or different (e.g., X's consist of OH and Cl). When R is a methyl group, the group CH₂=C(CH₃)COO is contained in the molecules in a number of not more than 2 for each Me.

According to this invention, preferred among the metal salts of general formula (I) are metal salts having the composition of the following formula (I)-a wherein R is as defined with regard to formula (I), X¹ groups are identical or different and represent a hydroxyl group or a chlorine atom, q is a number of from 1 to 4, and r is a number of from 2 to 5, provided that $q+r=6$, and/or metal salts having the composition of the following formula (I)-b wherein Me¹ represents Ca, Mg, Zn, Ti or Mn and t is equal to the atomic valence of Me¹ and is a number of 2 to 4.

Examples of the metal salts having the composition of formula (I) include Al₂(CH₂=CHCOO)₄Cl₂, Al₂(CH₂=CHCOO)₃Cl₃, Al₂(CH₂=CHCOO)₄(OH)₂, Al₂(CH₂=CHCOO)₄(OH)Cl, Al₂(CH₂=CHCOO)₂(OH)₂Cl₂, Al(CH₂=CHCOO)₃, Mg(CH₂=CHCOO)₂, Zn(CH₂=CHCOO)₂, and Ti(CH₂=CHCOO)₄.

Some of the aluminum metal salts exemplified above are already known (see Japanese Patent Publication No. 32970/1977).

The metal salts of general formula (I) are generally water-soluble, but as y becomes larger, their water solubility generally decreases. Salts in which R is a methyl group generally have lower solubility in water than the corresponding salts in which R is a hydrogen atom. Those salts in which R is a hydrogen atom and y is not more than 4, or those in which R is a methyl group and y is not more than 2 give aqueous solutions of suitable concentrations which can be used in this invention.

In combination with the metal salts of the formula (I), a film-forming polymeric compound, a monomer thereof, or a mixture of these is used. Preferably, the film-forming polymeric compound is a substantially linear, water-soluble, water-swellable or water-dispersible polymeric compound.

Examples of the water-soluble polymeric compound include polyvinyl alcohol, water-soluble melamine resins, water-soluble urea resins, polyacrylamide, polymethacrylamide, phenolic resins (e.g., resol resins), poly($C_2$–$C_4$)alkylene glycols (e.g., polyethylene glycol, polypropylene glycol, polytrimethylene glycol, polytetramethylene glycol, polyethylene glycol/propylene glycol block copolymer, etc.), poly(sodium acrylate), poly(sodium methacrylate), starch, hydroxyalkyl celluloses (e.g., hydroxyethyl cellulose, or hydroxypropyl cellulose), polyvinylpyrrolidone, water-soluble alkyd resins, copolymerized polyesters containing a sodium sulfonate group, hydroxyl-containing polyacrylic acids (e.g., a copolymer of methyl acrylate and hydroxyethyl acrylate), aliphatic mono- or polyglycidyl ethers (such as ethylene glycol diglycidyl ether, and diethylene glycol, ethylene glycol diglycidyl ether), poly(sodium styrenesulfonate), and water-soluble silicone resins. Among these, polymeric compounds having an aliphatic hydroxyl group are preferred.

Examples of the water-swellable or water-dispersible polymeric compounds include vinylidene chloride copolymers (e.g., a copolymer of vinylidene chloride and vinyl chloride), vinyl chloride copolymers (e.g., a copolymer of vinyl chloride and vinylidene chloride), an acrylate ester copolymer (e.g., a copolymer of methyl acrylate and methyl methacrylate), vinyl acetate copolymers (e.g., a copolymer of vinyl acetate and ethylene), copolyesters containing a carboxylate salt group, copolyesters containing a sulfonate salt group, maleic acid anhydride copolymers (e.g., a copolymer of maleic anhydride and vinyl chloride or vinyl acetate), and epoxy resins.

These water-soluble, water-swellable or water-dispersible polymeric compounds are known per se, and monomers which give these polymeric compounds are also known. In the present invention, these monomers can also be used. Examples of such monomers include hydroxyl-containing acrylic monomers of the formula $CH_2=C(R_1)COOR_2$ wherein $R_1$ represents a hydrogen atom or a methyl group, $R_2$ represents a group of the formula $-(CH_2)_nOH$, and n is 2 or 3, such as hydroxyethyl acrylate, hydroxypropyl acrylate and hydroxypropyl methacrylate; acrylamide-type monomers of the formula $CH_2=C(R_1)COON(R_4)(R_5)$ wherein $R_1$ represents as hydrogen atom or a methyl group, and $R_4$ and $R_5$ are identical or different and represent a hydrogen atom or a hydroxymethyl group, such as N-hydroxymethyl acrylamide or N,N-dihydroxymethyl acrylamide; epoxy compounds of the formula wherein $R_6$ is an aliphatic hydrocarbon group and m is a number of from 1 to 4, such as glycerin diglycidyl ether, furyl glycidyl ether and trimethylolpropane triglycidyl ether; vinyl compounds containing a sulfonate salt group such as sodium or potassium styrene sulfonate; acrylic or methacrylic acid salts such as sodium acrylate or sodium methacrylate; and vinyl-tris(alkoxyalkoxy)silanes such as vinyl-tris(beta-methoxyethoxy)silane or gamma-ureidopropyltris-ethoxysilane.

According to the process of this invention, the metal salt (A) having the composition of formula (I) and the film-forming polymeric compound, the monomer thereof or the mixture of these (B) are coated as an aqueous solution or dispersion on the surface of a film.

Whether they are used as an aqueous solution or an aqueous dispersion depends upon the desired concentrations of the metal salt and the polymeric compound used or the temperature used for preparation. It is important that even when they are in the form of an aqueous dispersion, the dispersed materials form very small particles, preferably a particle diameter of not more than 1.0 micron, upon drying on the film surface.

Usually, therefore, the aqueous solution or dispersion is prepared advantageously by mixing the ingredients first in a homogenizer and then further in an ultrasonic dispersing machine. If required, an emulsifier, a dispersing agent, etc. may be used to form the aqueous solution or dispersion.

According to the invention, the aqueous solution or dispersion so prepared is then coated continuously on the surface of a running polyester film before completion of its crystalline orientation, namely a running unstretched or monoaxially stretched polyester film. The aqueous solution or dispersion contains the metal salt of formula (I) in a concentration of preferably about 0.1 to about 10% by weight, more preferably about 0.5 to about 5% by weight, and the film-forming polymeric compound, the monomer thereof or the mixture of these in a concentration of preferably about 0.05 to about 5% by weight, more preferably about 0.2 to about 2% by weight.

The aqueous solution or dispersion is applied at a rate of preferably about 0.5 to about 10 g, more preferably about 1 to about 5 g, per $m^2$ of the surface of the running film. In other words, the aqueous solution or dispersion is applied to the running film in such an amount that in the biaxially stretched film finally obtained, about 0.001 to about 0.3 g of solids are formed on the film surface per $m^2$ of the film surface.

If, in the process of the invention, the aqueous solution or dispersion is coated on a film which has already been biaxially stretched, it is impossible to produce a slippery film having numerous minute protrusions on its surface in accordance with this invention. According to the process of this invention, the aqueous solution or dispersion is coated preferably on a monoaxially stretched film before it enters a tenter for second stretching and heat-setting.

The aqueous solution or dispersion can be applied according to this invention to one or both surfaces of an unstretched or monoaxially stretched film. The final slippery biaxially stretched film of this invention obtained by applying the aqueous solution or dispersion only on one surface of the film has a dual surface structure in which one surface has numerous minute protrusions and the other surface is smooth, and can be especially suitably used as a material for magnetic tapes.

The application of the aqueous solution or dispersion can be effected by techniques known per se, for example reverse coating (e.g., bottom feed three reverses, bottom feed four reverses, two roll reverse, or top feed three reverses), kiss Meyer coating, gravure coating (direct gravure coating or slot gravure coating), slot die coating, or curtain coating.

According to a preferred embodiment of this invention, the slippery film of the invention having the aforesaid dual surface structure can be produced advantageously by coating the aqueous solution or dispersion by means of a roll coater to the undersurface of a monoaxially stretched film which is running substantially horizontal after leaving nip rollers.

According to the invention, the aqueous solution or dispersion coated in uniform thickness by the aforesaid means on the polyester film surface then increases in area and undergoes heating to dissipate water as the polyester film is stretched. Thus, it is converted into a thin solid coating having numerous minute protrusions and fixed firmly to the surface of the biaxially stretched film.

It is by heating that the aqueous solution or dispersion coated on the film surface is converted to a solid coating having numerous minute protrusions. In view of the fact that the aforesaid solid coating is obtained even when the monomer of the film-forming polymeric compound is used, the aforesaid heating is believed to induce some reaction. Although no detailed mechanism has been known, it is presumed that such a reaction is the one in which the metal salt (A) and the film-forming polymeric compound or its monomer (B) participate, or the polymerization reaction of the monomer, or in some cases, it is a reaction in which the polyester forming the film base participates.

In any case, the fact remains that the solid coating formed on the surface of the polyester film in accordance with this invention at least contains the metal salt (A) of formula (I) and the film-forming polymeric compound (B).

Investigations of the present inventors have shown that heating is absolutely necessary for the formation of the numerous minute protrusions, and if, for example, the aforesaid aqueous solution of dispersion is applied to a monoaxially stretched film and then dried in the air without heating, it is impossible to form numerous minute protrusions substantially having form retention.

In the process of this invention, the heating is carried out preferably at a temperature of about 100° to about 240° C., for a period of about 1 to about 20 seconds. These temperatures and times of heating are included within the temperatures and times actually employed in a series of usual steps in the production of biaxially stretched polyester films, above all in a heat-setting step, and this fact demonstrates the utmost advantage of the practice of this invention on an industrial scale.

Investigations of the present inventors further show that the formation of the solid coating having numerous minute protrusions is subtly affected by the stretch ratio of the film, the composition or amount of the aqueous solution or dispersion to be applied to the film, etc. For example, if the configuration of the minute protrusions is taken up, the solid coating, for example, has lamellar protrusions, mountain chain-like gathers, crepe-like creases, or elliptical craterings in which small particles are dotted.

The solid coating having a lamellar structure can be easily formed by using a combination of the metal salt of formula (I) with a certain kind of water-soluble film-forming polymeric compound, for example a combination of the metal salt of formula (I) with polyoxyethylene glycol and polyoxyethylene glycol diglycidyl ether having a molecular weight of more than 6,000. When the solids of the coating contain 52 to 93% by weight of $Al_2(CH_2=CHCOO)_4Cl_2$ as the metal salt of formula (I), a solid coating having a very distinct lemellar structure can be easily formed.

The coating having mountain chain-like gathers can be formed easily by, for example, using a combination of $Ti(CH_2=CHCOO)_4$ and/or $Al(CH_2=CHCOO)_3$ as the metal salt of formula (I) with polyvinyl alcohol or a methylolated melamine resin as the water-soluble film-forming polymeric compound.

The slippery biaxially stretched polyester film of this invention having a solid coating with such mountain chain-like gathers exhibits especially good slipperiness. In particular, a coating having mountain chain-like gathers can be very easily formed when the solids of the coating contain 54 to 87% by weight of the metal salt.

The solid coating having crepe-like creases can be easily formed, for example, by using a combination of $Al_2(CH_2=CHCOO)_3Cl_3$ with a silane compound such as vinyl-tris(beta-methoxyethoxy)silane, gamma-glycidoxy propyl trimethoxysilane or gamma-aminopropyl-triethoxysilane. In particular, when the solids of the coating contain 35 to 72% by weight of $Al_2(CH_2=CHCOO)_3Cl_3$, a coating having crepe-like creases and good slipperiness can be very easily formed.

The coating having elliptical craterings in which small particles are dotted can be easily formed, for example, by using a combination of $Zn(CH_2=CHCOO)_2$ and methyl hydrogen polysiloxane or dimethylpolysiloxane diglycidyl ether further in conjunction with a slip agent filler (to be described hereinbelow) such as a fine powder of polytetrafluoroethylene. In particular, when the solids contain 25 to 84% by weight of $Zn(CH_2=CHCOO)_2$, a coating having good slipperiness and the aforesaid structure can be very easily formed.

The aqueous solution or dispersion to be coated on the film surface in this invention may include various additives in addition to the components (A) and (B). Such additives include slip agent fillers to be added for the purpose of imparting better slipperiness, surface-active agents to be added for the purpose of improving the solubility or dispersibility of the components (A) and (B) and the slip agent fillers, and for the purpose of improving the wettability of these components with the polyester, crosslinking agents, polymerization catalysts, and stabilizers such as heat stabilizers and ultraviolet absorbers.

The aforesaid additives are known per se. Examples of the slip agent filler include fine powders of organic fillers such as polytetrafluoroethylene, polyvinylidene fluoride, polyethylene or polyacrylonitrile or fine powders of inorganic fillers such as titanium dioxide, silica, alumina, kaolin, talc, graphite, calcium carbonate, feldspar or molybdenum disulfide. Examples of the surface-active agents are nonionic surfactants such as polyoxyethylene nonylphenyl ether. Examples of the polymerization catalyst are radical polymerization catalysts such as 2,2'-azobis(2-amidinopropane)hydrochloride, ammonium persulfate, potassium persulfate, and sodium persulfate.

Since it is not necessary to add so much additives to the aqueous solution or dispersion used in this invention, their particle sizes do not pose a problem if they are water-soluble. However, the lubricant fillers which are generally water-insoluble solid substances are preferably used in an average particle size of about 0.005 to 1 micron. It is also preferred that such water-insoluble solid substances should have a specific gravity of at least about 3 in order to avoid sedimentation in the aqueous dispersion.

The aqueous dispersion which further includes the aforesaid finely divided slip agent filler gives a coating which has protrusions based on the fine powder of the filler as a part of the numerous minute protrusions mentioned above. Such protrusions based on the fine powder of the filler frequently give better slipperiness than in the absence of such protrusions based on the fine powder. Usually, the fine powder of the slip agent filler can be included in an amount of about 0.1 to about 3% by weight based on the aqueous solution or dispersion.

Thus, according to the process of this invention, there is provided a slippery biaxially stretched polyester film having a continuous coating with numerous minute protrusions substantially having form retention, said coating being formed substantially all over on at least one surface of a polyester film and at least containing the metal salt of formula (I) and the film-forming polymeric compound.

The term "minute protrusions substantially having form retention" means minute protrusions whose form is substantially retained under the influence of a frictional force exerted on the resulting film during use. Specifically, the minute protrusions substantially having form retention, as referred to in this invention, are defined by percent form retention (F, %) represented by the following equation $$F = \left\{ 1 - \frac{(\mu_k)_A - (\mu_k)_B}{(\mu_k)_B} \right\} \times 100$$

wherein $(\mu_k)_A$ is the coefficient of dynamic friction in the 20th sliding cycle measured by using a reciprocating friction tester, and $(\mu_k)_B$ is the coefficient of dynamic friction in the first sliding cycle measured by using the same tester.

Preferably, the minute protrusions of the film of this invention have a percent form retention (F) of 100 to about 75%.

It should be understood that the "continuous coating" does not denote a coating in such a state that independent minute protrusions are formed directly on the surface of a polyester base film, but denotes a coating which seems as if it were a continuous base coating which exists on the surface of the polyester base film separately from the minute protrusions. Accordingly, the substantially continuous coating having minute protrusions in accordance with this invention consists of a substantially continuous base coating in contact with the surface of a polyester film and numerous minute protrusions integral with the base coating and extending outwardly therefrom. This continuous coating having numerous minute protrusions is formed as a unit by one coating of the aqueous solution or dispersion in accordance with the process of this invention.

The slippery biaxially stretched polyester film of this invention contains the continuous coating having minute protrusions in an amount of about 2.5 to about 200 mg, preferably about 5 to about 150 mg, per m² of the film surface.

When the aforesaid continuous coating contains a water-insoluble solid substance having an average particle diameter of about 0.005 to about 1 micron, preferably a fine powder of a slip agent filler, protrusions based on this fine powder, in conjunction with the protrusions based on the metal salt of formula (I) and the film-forming polymeric compound, reduce the contact area of two film surfaces and cohesive-shear force, and can serve to give the slippery biaxially stretched polyester film having better slipperiness.

The polyester base film of the slippery biaxially stretched polyeser film of this invention is formed of an aromatic homo- or co-polyester composed of an aromatic dibasic acid such as terephthalic acid or isophthalic acid as a main acid component and an aliphatic diol having 2 to 6 carbon atoms such as ethylene glycol, trimethylene glycol, tetramethylene glycol and hexamethylene glycol as a main glycol component, preferably polyethylene terephthalate. Techniques for producing films from these aromatic homo- or co-polyesters are known in the art.

The slippery biaxially stretched polyester film of this invention has very good slipperiness as will be shown below in Examples by specific data, and is therefore used suitably in various fields which require excellent slipperiness, especially as a material for magnetic tapes.

The following examples illustrate the present invention more specifically. The various properties used in these examples were measured by the following methods.

(1) PV value (peak-to-valley value)

The PV value of surface roughness was measured by the following method.

A surface-roughened film was measured by a needle pointer-type surface roughness tester made by Tokyo Seimitsu K. K. (SURFCOM 3B), and its film roughness curve was determined under a load of 0.19 g using a needle with a radius of 2 μm and recorded on a chart with a magnification of 50 times along the base line on the film and 50,000 times perpendicular to the plane of the film. From the profile roughness curve obtained by this measurement, a portion corresponding to a measured length of the film (standard length 26 mm) was sampled. In this portion of the profile roughness curve, the largest distance between a peak and an adjacent valley was measured. The quotient obtained by dividing this distance by the magnification perpendicular to the plane of the film (i.e. 50,000), and expressed in microns. An average of 10 replicates measured and calculated in the same manner as above is defined as the PV value.

(2) CLA value of surface roughness

The CLA (center line average) value of a surface roughness was measured by the following method according to JIS B0601.

A surface-roughened film was measured by, for example, a needle pointer-type surface roughness tester made by Tokyo Seimitsu K. K. (SURFCOM 3B), and its film roughness curve was determined under a load of 70 mg using a needle with a radius of 2 μm and recorded on a chart with a magnification of 50 times along the base line on the film and 50,000 times perpendicular to the plane of the film. From the profile roughness curve obtained by this measurement method, a portion corresponding to a measured length L (standard length 2 mm) was sampled. The portion of the profile curve is expressed by the equation $Y=f(X)$, taking the center line of the portion as X axis and the direction of the vertical axis of the chart as Y axis, and CLA value is calculated according to the following equation and expressed in μm unit.

$$CLA = \frac{1}{L} \int_0^L f(x) \, dx$$

The measurement was done on eight samples. The three largest values were excluded, and the average of the remaining five measured values was calculated, and defined as CLA. The above measurement was done both in the longitudinal and transverse directions of the film, and the average of these was determined.

Figure 3:
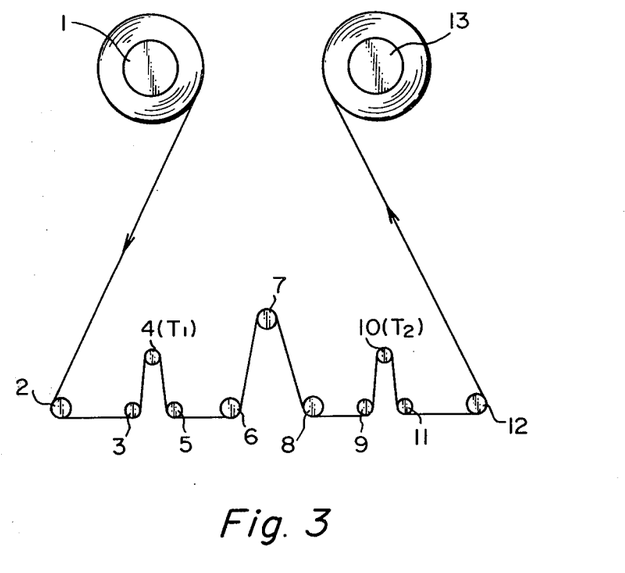

(3) Coefficient of dynamic friction (see FIG. 3)

In FIG. 3, 1 is an unwinding reel, 3,5,6,8,9, and 11 are free rollers, 12 is a guide roller, and 13 is a winding wheel.

In an atmosphere kept at 20° C. and 60% RH, a film cut to a width of ½ inch was brought into contact at a winding angle of (152/180)×π radian with a fixed rod 7 made of 18-8 stainless steel (SUS 304) and having an outside diameter of 5 mm and a surface roughness CLA of 0.030 (micron). The film was then moved at a speed of 3.3 cm/sec to cause friction. The coefficient of dynamic friction ($\mu_k$) was calculated in accordance with the following equation in which $T_2$ in grams is the outlet tension detected by an outlet tension detector 10 when a tension controller 2 was adjusted so that the inlet tension $T_1$ detected by an inlet tension detector 4 was 30 g. The dynamic friction coefficient $\mu_k$ in accordance with this invention is the one obtained when the film was caused to travel over a distance of 89.1 meters.

$$\mu_k = \frac{1}{\pi} \ln \frac{T_2}{T_1} = 0.868 \log \frac{T_2}{30}$$

(4) Shavability

Whether a deposit occurred on the fixed rod during the measurement of the coefficient of dynamic friction in the manner described above was observed with the naked eye. The results was evaluated as follows:

O: No deposit was noted.
Δ: A little deposit was noted.
X: Much deposit was noted.

It was judged that the shavability of the film was worse as the amount of the deposit was larger.

(5) Film slipperiness

By using a slipperiness tester of Toyo Tester Co., Ltd., the coefficient of dynamic friction ($\mu_d$) and the coefficient of static friction ($\mu_s$) between the roughened surface of a film and the smooth surface of a polyethylene terephthalate film were measured.

(6) Form retention of numerous minute protrusions

The percent form retention (F, %) defined by the following equation was calculated by using the coefficients of dynamic friction measured by means of a reciprocating friction tester (by the method of (3) above Coefficient of dynamic friction).

$$F(\%) = \left\{ 1 - \frac{(\mu_k)_A - (\mu_k)_B}{(\mu_k)_B} \right\} \times 100$$

wherein $(\mu_k)_A$ is the coefficient of dynamic friction in the 20th sliding cycle, and $(\mu_k)_B$ is the coefficient of dynamic friction in the first sliding cycle.

EXAMPLE 1

(1) Sixty parts by weight (as solids) of a 30% aqueous solution of $Al_2(CH_2=CHCOO)_3Cl_3$ (P-3, a trademark for a product of Asada Chemical Industry Co., Ltd.), 15 parts by weight (as solids) of a 10% aqueous solution of $Ti(CH_2=CHCOO)_4$, 100 parts by weight of polyvinyl alcohol (Poval A, a trademark for a product of Shin-etsu Chemical Co., Ltd.), 5 parts by weight of molybdenum disulfide (DAG-206, a tradename for a product of Nippon Atison Co., Ltd.) and 10 parts by weight of polyoxyethylene nonyl phenyl ether (HLB=12.8; NS208.5, a tradename for a product of Nippon Oils and Fats Co., Ltd.) were mixed fully first by a homogenizer and then by an ultrasonic dispersing machine to form a coating composition. The coating composition was dissolved in deionized water at a pH of 7 to prepare a coating solution having a total solids concentration of 2% by weight.

(2) Polyethylene terephthalate (crystal fusion heat 9.8 cal/g) having an intrinsic viscosity, measured in orthochlorophenol at 25° C., of 0.62 and not containing any inorganic filler was extruded from a spinneret by means of an extruder, and cast onto a drum cooled at 40° C. while applying static charge. Thus, an extruded film having a thickness of 152 microns was obtained. The film was then stretched to 3.6 times its original dimension in the longitudinal direction on a metal roll heated at 98° C.

The coating solution prepared as in (1) above was then uniformly coated on on one surface of the monoaxially stretched film, immediately before it entered a tenter, by means of a coater bed composed of three rolls. The amount of the coating formed was about 2.3 g per m$^2$ of the monoaxially stretched film (this amount corresponded to about 0.0129 g/m$^2$ of the biaxially stretched film described below). The coating monoaxially stretched film was then introduced into the tenter and stretched to 3.5 times in the transverse direction at 101° C., and then heat-set at 225° C. for 6.3 seconds. (The total time during which the coated film was heated was 11 seconds.) The biaxially stretched film could be wound up under a tension of 9.8 kg without the occurrence of wrinkles. The resulting film (the film of the invention) was slit to a width of ½ inch, and 52 wound tape rolls each having a length of 500 m were produced. During this time, film slitting could be carried out in good condition without any trouble.

The surface properties, runability and other data of the resulting film are shown in Table 1.

It is clear from a comparison of this film with the film of Comparative Example 1 (not coated with the coating solution) that the film of the invention has very good basic properties for use as a base film of magnetic tapes.

Figure 1:
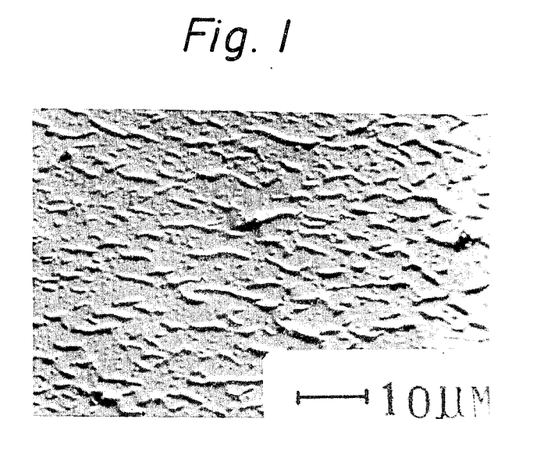
FIGS. 1 and 2 of the accompanying drawings are microphotographs (400X), taken through a differential interference microscope, of the coatings of the slippery biaxially stretched polyester films of this invention.

FIG. 1 of the accompanying drawings shows a photograph (400X), taken through a differential interference microscope, of the treated surface of the film obtained in Example 1. From the photograph, the numerous minute protrusions were observed as creases or wrinkles.

EXAMPLE 2

(1) A coating solution having a total solids concentration of 1.5% by weight was produced in the same way as in Example 1, (1) by using 66 parts by weight (as solids) of an 8.4% (as solids) aqueous solution of $Al_2(CH_2=CHCOO)_3Cl_3$ and polyacrylamide (KAL No. 13, a tradename for a product of Asada Chemical Industry Co., Ltd.), 7 parts by weight of a water-soluble melamine condensate consisting mainly of methylolated melamine (Watersol S-695, a tradename for a product of Dainippon Ink & Chemicals, Inc.), 13 parts by weight of polytetrafluoroethylene (Lubron L-2, a tradename for a product of Daikin Kogyo K. K. average particle diameter 0.2 microns) and 14 parts by weight of a nonionic surface active agent, NS208.5.

(2) A biaxially stretched film in accordance with this invention was produced in the same way as in Example 1, (2) except that the coating solution prepared in (1) above was coated on one surface of the monoaxially stretched film at a rate of about 3 g/m$^2$ (which corresponded to about 0.0129 g per m$^2$ of the final biaxially stretched film). This biaxially stretched film could be wound up under a tension of 9.8 kg without any trouble. Slitting of the film could be carried out without any trouble.

The surface properties, runability, and other data of the film obtained are shown in Table 1.

EXAMPLE 3

(1) A coating solution having a total solids concentration of about 2% by weight was prepared in the same way as in Example 1, (1) by using 40 parts by weight (as solids) of a 30% aqueous solution of $Al_2(CH_2=CH-COO)_3Cl_3$, 33 parts by weight of vinyl-tris-(beta-methoxyethoxy)silane (A-172, a tradename for a product of Nippon Unicar Co., Ltd.), 15 parts by weight of gamma-ureidopropyltriethoxysilane (A-1160, a tradename for a product of Unitica Ltd.), 2 parts by weight of 2,2'-azobis(2-amidinopropane)hydrochloride (V-50, a tradename for a product of Wako Pure Chemicals, Co., Ltd.) and 10 parts of a nonionic surfactant NS 208.5.

(2) A biaxially stretched film in accordance with this invention was produced in the same way as in Example 1, (2) except that the coating solution obtained in (1) above was coated on one surface of the monoaxially stretched film at a rate of about 2.4 g/m² (corresponding to about 0.0135 g/m² of the biaxially stretched film). The resulting biaxially stretched film could be wound up under a tension of 9.8 kg without any trouble. Slitting of this film could be performed without any trouble.

The surface properties, runability and other data of the film obtained are also shown in Table 1.

Figure 2:
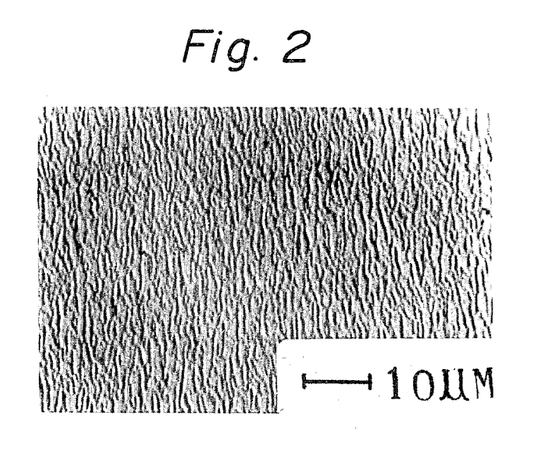

FIG. 2 of the accompanying drawings shows a microphotograph (400X), taken through a differential interference microscope, of the treated surface of the film obtained in Example 3 on which aluminum was vacuum-deposited.

EXAMPLE 4

(1) A coating solution having a total solids concentration of about 2.5% by weight was prepared in the same way as in Example 1, (1) by using 60 parts (as solids) of a 30% aqueous solution of $Al_2(CH_2=CHCOO)_4(OH)_2$ (P-8, a tradename for a product of Asada Chemical Industry Co., Ltd.), 20 parts by weight of polyethylene glycol (PEG 200, a tradename for a product of Nippon Oils and Fats Co., Ltd.; average molecular weight 20,000), 5 parts by weight of molybdenum disulfide, 10 parts by weight of polyoxyethylene diglycidyl ether (NER 010, a tradename for a product of Nagase Sangyo Co., Ltd.) and 5 parts by weight of a nonionic surfactant, NS 208.5.

(2) A biaxially stretched film in accordance with this invention was produced in the same way as in Example 1, (2) except that the coating solution prepared in (1) above was coated on the monoaxially stretched film at a rate of 4.1 g/m² (which corresponded to about 0.0286 g/m² of the final biaxially stretched film). The resulting film could be wound in good condition without any trouble, and slitting of the film was also performed without any trouble.

The surface properties, runability and other data of the resulting film are shown in Table 1.

COMPARATIVE EXAMPLE 1

A biaxially stretched film was produced in the same way as in Example 1, (2) except that the coating solution was not applied. The resulting film could not be wound up under a tension of 9.8 kg. Because of poor slipperiness between the film surfaces, wrinkles occurred. These wrinkles propagated progressively to the surface layer of the film to give a film roll which was hard at one end portion and soft at its central portion. The film roll of such a shape is not suitable for marketing.

An attempt was made to wind up the film under a tension of 4.68 kg, but the end portion of the film roll is non-uniform and winding wrinkles were formed. Thus, a film roll of a complete wound shape could not be obtained. Microslitting of the film to a width of ½ inch failed.

TABLE 1

| | Example 1 | | Example 2 | | Example 3 | | Example 4 | | Comparative Example 1 |
| --- | --- | --- | --- | --- | --- | --- | --- | --- | --- |
| | coated surface | un-coated surface | coated surface | un-coated surface | coated surface | un-coated surface | coated surface | un-coated surface | Uncoated |
| Micro-slittability | Good | | Good | | Good | | Good | | slitting impossible because of the trouble of a mill roll |
| PV value | 0.300 | 0.098 | 0.228 | 0.098 | 0.121 | 0.098 | 0.109 | 0.098 | 0.098 |
| CLA value | 0.015 | 0.007 | 0.023 | 0.007 | 0.010 | 0.007 | 0.008 | 0.007 | 0.007 |
| Film slipperiness | $\mu_s$: 0.25 $\mu_d$: 0.23 | | $\mu_s$: 0.25 $\mu_d$: 0.28 | | $\mu_s$: 0.28 $\mu_d$: 0.25 | | $\mu_s$: 0.26 $\mu_d$: 0.23 | | Too high to be measured |
| Runability (dynamic friction coefficient, $\mu_k$) | 0.22 | | 0.19 | | 0.26 | | 0.25 | | No sample could be obtained because of the failure of slitting |
| Shavability | 0 | | 0 | | 0 | | 0 | | Unmeasurable because a sample could not be obtained |

EXAMPLE 5

(1) A coating solution having a total solid concentration of about 2.5% by weight was prepared in the same way as in Example 1, (1) by using 60 parts by weight (as solids) of a 30% aqueous solution of $Ca(CH_2=C(CH_3)COO)_2$ (a product of Asada Chemical Industry Co., Ltd.), 25 parts by weight of polyethylene glycol (PEG 200), 10 parts by weight of polyoxyethylene diglycidyl ether (NER 010), 5 parts by weight of molybdenum disulfide and 5 parts by weight of a nonionic surface-active agent (NS 208.5).

(2) A biaxially stretched film in accordance with this invention was produced in the same way as in Example 1, (2) except that the coating solution prepared as in (1) was coated on the monoaxially stretched film at a rate of about 4.1 g/m² (corresponding to about 0.0286 g/m² of the final biaxially stretched film).

The results are shown in Table 2.

EXAMPLE 6

(1) A coating solution having a total solids concentration of about 2% by weight was prepared in the same way as in Example 1, (1) by using 55 parts by weight (as solids) of a 40% aqueous solution of $Mg(CH_2=CHCOO)_2$ (a product of Asada Chemical Industry Co., Ltd.), 20 parts (as solids) of a 50% aqueous solution of $Zn(CH_2=C(CH_3)COO)_2$ (a product of Asada Chemical Industry Co., Ltd.), 10 parts by weight of polyvinyl alcohol (Poval A), 5 parts by weight of molybdenum disulfide and 10 parts by weight of a nonionic surface-active agent (NS 208.5).

(2) A biaxially stretched film in accordance with this invention was produced in the same way as in Example 1, (2) except that the coating solution prepared in (1) above was coated on the monoaxially stretched film at a rate of about 2.4 g/m² (corresponding to about 0.0135 g/m² of the final biaxially stretched film). The results are also shown in Table 2.

This biaxially stretched film could be wound up in good condition under a tension of 9.8 kg, and could be microslit in good condition to a width of ½ inch.

A microphotograph (400X), taken through a differential interference microscope, of the treated surface of the resulting film on which aluminum was vacuum-deposited showed numerous minute protrusions.

EXAMPLE 7

(1) A coating solution having a total solid concentration of about 2.5% by weight was prepared in the same way as in Example 1 by using 60 parts by weight (as solids) of a 30% aqueous solution of $Al_2(CH_2=CHCOO)_4(OH)_2$ (P-8, a tradename for a product of Asada Chemical Industry Co., Ltd.), 20 parts by weight of polyethylene glycol (PEG 200), 10 parts by weight of polyoxyethylene glycol diglycidyl ether (NER 010), 5 parts by weight of molybdenum disulfide and 5 parts by weight of a nonionic surface-active agent (NS 208.5).

(2) A biaxially stretched film in accordance with this invention was produced in the same way as in Example 1, (2) except that the coating solution prepared in (1) above was coated on the monoaxially stretched film at a rate of about 4.1 g/m² (corresponding to about 0.0288 g/m² of the final biaxially stretched film). The results are shown in Table 2.

EXAMPLE 8

(1) A coating solution having a total solids concentration of about 2% by weight was prepared in the same way as in Example 1, (1) by using 70 parts by weight (as solids) of a 30% aqueous solution of $Al_2(CH_2=CHCOO)_2(OH)_2Cl_2$ (a product of Asada Chemical Industry Co., Ltd.), 5 parts by weight of a water-soluble copolyester (FINETEX-ES 650, a tradename for a product of Dainippon Ink and Chemicals, Inc.), 10 parts by weight of polyvinyl alcohol (Poval A), 5 parts by weight of molybdenum disulfide and 10 parts by weight of a nonionic surface-active agent (NS 208.5).

(2) A biaxially stretched film in accordance with this invention was produced in the same way as in Example 1, (2) except that the coating solution prepared in (1) above was coated on the monoaxially stretched film at a rate of about 2.35 g/m² (which correspond to about 0.0132 g/m² of the final biaxially stretched film). The results are shown in Table 2.

This biaxially stretched film could be wound up in good condition under a tension of 9.8 kg, and could be microslit in good condition to a width of ½ inch.

A microphotograph (400X), taken through a differential interference microscope, of the treated surface of this film on which aluminum was vacuum-deposited showed numerous minute protrusions.

TABLE 2

| Properties | Example 5 Coated surface | Example 5 Uncoated surface | Example 6 Coated surface | Example 6 Uncoated surface | Example 7 Coated surface | Example 7 Uncoated surface | Example 8 Coated surface | Example 8 Uncoated surface |
|---|---|---|---|---|---|---|---|---|
| Microslittability | Good | | Good | | Good | | Good | |
| PV value | 0.256 | 0.098 | 0.235 | 0.098 | 0.287 | 0.098 | 0.273 | 0.098 |
| CLA | 0.020 | 0.007 | 0.024 | 0.007 | 0.023 | 0.007 | 0.026 | 0.007 |
| Film slipperiness | $\mu_s$: 0.26  $\mu_d$: 0.24 | | $\mu_s$: 0.24  $\mu_d$: 0.23 | | $\mu_s$: 0.27  $\mu_d$: 0.24 | | $\mu_s$: 0.23  $\mu_d$: 0.23 | |
| Runability (dynamic friction coefficient) | 0.28 | | 0.24 | | 0.27 | | 0.23 | |
| Shavability | 0 | | 0 | | 0 | | 0 | |

EXAMPLE 9

Polyethylene terephthalate (crystal fusion heat 9.8 cal/g) having an intrinsic viscosity, measured at 25° C. in o-chlorophenol, of 0.62 and containing no inorganic filler was extruded through a spinneret by an extruder, and cast on a drum cooled at 40° C. while applying static charge. Thus, an extruded film having a thickness of 927.2 microns was obtained. The film was subsequently stretched to 3.6 times its original length by a metallic roll heated at 93° C. The same coating solution as prepared in Example 4, (2) was coated on the monoaxially stretched film by the same method as set forth in Example 1, (2) to give a biaxially stretched film (the polyethylene terephthalate base film had a thickness of 75 microns) containing the coating at a rate of 0.0269 g/m² (as solids). The uncoated surface of the biaxially stretched film was subjected to corona discharge treatment to activate it (the state in which the film was wet with a 54 dynes/cm² JIS wet index solution), and then cut to a size of A4 (according to JIS). Fifty such A4 size film samples were stacked in an electrophotographic copying machine (U-bix V, a tradename for a product of Konishiroku Co., Ltd.) and used as copy sheets in a continuous cycle of printing (copying). The toner was caused to adhere to the corona-treated surface of the films. The film samples could be conveyed separately, and no two or more films were fed in superposition. Thus, these films had very good handlability in a copying operation. Furthermore, these films had superior slipperiness as plain paper copy for overhead projection.

EXAMPLE 10

A cast film having a thickness of 1545 microns was produced under the same conditions as in Example 9 except that the amount of the polymer extruded was changed. The film-formation was performed such that the film, after biaxial stretching and heat setting, would have a thickness of 125 microns. In the film-forming process, the same coating solution as used in Example 2 was applied to one surface of the film immediately before the film was stretched transversely after monoaxial stretching. Thus, a coating having good slipperiness was formed on one surface of the film at a rate of about 0.0129 g/m².

For comparison, a biaxially stretched film (blank) was produced in the same way as above except that the coating solution was not applied. In this comparison, the film could be wound up under a considerably low tension. When this film (blank) was stored in the form of an aswound roll, Newton's rings owing to aggregation occurred here and there at the intimately contacting portions between the films, and were observed as a spot-like pattern. Such a pattern was not observed in the biaxially stretched film of this invention.

Each of these films was cut to a B-4 size (JIS). The same TV animation was drawn on 150 B-4 size pieces of each of these films and then stacked. Each stack of films was viewed through at a position about 60 cm apart from it.

In the stack of the blank films, a wet spot-like pattern was locally observed. When this pattern was photographed, it was seen as a ghost. In contrast, no such pattern was noted in the stack of the film in accordance with this invention.

Accordingly, the film of this invention had sufficient optical properties for use as an optical projecting material for animation.

What we claim is:

1. A slippery biaxially stretched polyester film having a substantially continuous coating with numerous protrusions substantially having form retention, said coating being formed substantially all over on at least one surface of the film and at least comprising a film-forming polymeric compound and a metal salt having the composition of formula (I)

wherein Me represents a metal ion having a valence of 2 to 6, R is a hydrogen atom or a methyl group, X is one equivalent of an anion, y is a number of from 1 to 6, z is a number of from 0 to 2, w is a number of from 0 to 8, and p is a number equal to the quotient obtained by dividing the total of y+2z+w by the atomic valence of Me, provided that when y is a number of 2 or more, two or more R groups may be identical or different, when w is a number of 2 or more, two or more X ions may be identical or different, and the group in the case of R=methyl is contained in a number of not more than 2 for each Me, and said coating consisting of a substantially continuous base coating layer in contact with the surface of the polyester base film and numerous minute protrusions integral with the base coating layer and extending outwardly therefrom.

2. The polyester film of claim 1 which has a dual surface structure having the continuous coating only on one surface of the film.

3. The polyester film of claim 1 or 2 wherein the numerous minute protrusions substantially having form retention have a percent form retention (F, %), defined by the following equation, of 100 to about 75%, $$F = \left\{ 1 - \frac{(\mu_k)_A - (\mu_k)_B}{(\mu_k)_B} \right\} \times 100$$

wherein $(\mu_k)_A$ is the coefficient of dynamic friction measured by the method described in the specification by means of a reciprocating friction tester in the 20th sliding cycle, and $(\mu_k)_B$ is the coefficient of dynamic friction measured in the same way in the first sliding cycle.

4. The polyester film of claim 1 wherein the continuous coating further includes a water-insoluble solid substance having an average particle diameter of about 0.005 to about 1.0 micron.

5. The polyester film of claim 1 wherein the continuous coating is formed at a rate of about 2.5 to about 200 mg per m² of the film.

6. The polyester film of claim 1 wherein the polyester base film is composed of an aromatic homo- or co-polyester composed of an aromatic dibasic acid as a main acid component and an aliphatic diol having 2 to 6 carbon atoms as a main glycol component.

* * * * *